United States Patent [19]

Crowell

[11] Patent Number: 4,799,764
[45] Date of Patent: Jan. 24, 1989

[54] SPECTRAL IMAGE VIEWING DEVICE

[75] Inventor: Christopher S. Crowell, Old Lyme, Conn.

[73] Assignee: Structural Graphics, Inc., Essex, Conn.

[21] Appl. No.: 137,421

[22] Filed: Dec. 23, 1987

[51] Int. Cl.4 .......................... B44F 1/00; G02B 27/04
[52] U.S. Cl. .................................. 350/162.18; 350/168
[58] Field of Search ............................ 350/162.18, 168

[56] References Cited

U.S. PATENT DOCUMENTS 3,468,599  9/1969  Jordan .................................. 350/168

Primary Examiner—Bruce Y. Arnold
Attorney, Agent, or Firm—Mattern, Ware, Stoltz & Fressola

[57] ABSTRACT

A spectral image viewing device incorporates a thin semi-transparent sheet of prismatic polytetrafluoroethylene polymer film, a viewing aperture and an image producing aperture. The device produces a visually perceptible array of spectral images when aligned with a light source. The device can be in the form of an attractive eye-catching desk-top calendar or decoration formed as flattenable pop-up cardboard structures resembling solid polyhedrons having similar polygons as top and bottom supporting panels.

10 Claims, 2 Drawing Sheets

SPECTRAL IMAGE VIEWING DEVICE

BACKGROUND OF THE INVENTION

This invention relates to novelty viewing devices and, more particularly, it relates to such devices producing visually perceptible spectral images.

Novelty items such as self-erecting pop-up calendars, advertising devices, etc. are generally used for conveying information and for decorating purposes. To make such devices more attractive and useful, it would be desirable to add a viewing device therein creating a visual perceptible multi-dimensional display of corporate or team logos or various other designs and shapes.

SUMMARY OF THE INVENTION

Accordingly, a principal object of this invention is to provide a spectral image viewing device capable of producing a visually perceptible array of spectral images.

A further object of the invention is to provide such a viewing device in the form of a flattenable self-erectable pop-up polygonal structure.

Another object of the invention is to provide such devices which are readily and economically fabricated.

Other objects of the invention will in part be obvious and will in part appear hereinafter.

It has now been found that the foregoing and related objects can be readily attained in a spectral image viewing device including a structure having first and second spaced apart panels and forming an enclosure. The first panel has a viewing aperture formed therein through which a user can peer while the second panel has an image producing aperture therein in a desired shape. The viewing aperture and image producing aperture are aligned so that a direct line of vision of a user peering through the viewing aperture extends through the image producing aperture. The device also has a semi-transparent prismatic device mounted within the enclosure between the viewing aperture and the image producing aperture in the direct line of vision of the user whereby the semi-transparent prismatic device separates white light coming from the exterior of the enclosure and passing through the enclosure between the image producing aperture and the view aperture into an array of visually perceptible spectral images.

According to the invention, the semi-transparent prismatic device is a polytetrafluoroethylene polymer film having a laser produced pattern thereon. The pattern is ideally provided on one face of the film in an optical grating pattern formed as an arrayed plurality of generally v-shaped lands and grooves simulating an arrayed plurality of miniature triangular prisms. The semi-transparent prismatic device can be mounted on the first panel adjacent and covering the viewing aperture.

Desirably, the structure is a flattenable pop-up structure formed of stiff foldable sheet material, self-erectable into an erect configuration resembling a polygonal solid. In the pop-up structure, the first and second panels are similar polygonal top and bottom face panels with pairs of upper and lower trapezoidal face panels, having short parallel edges foldably joined to the polygonal top and bottom face panels. The pairs of upper and lower trapezoidal face panels extend diagonally outwardly from the top and bottom face panels to meet in an equatorial plane with longer parallel edges foldably joined together to define an equatorial plane polygon similar to but larger than the top and bottom polygonal face panels.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be made to the following detailed description taken in connection with the accompanying drawings.

BEST MODE FOR CARRYING OUT THE INVENTION

Figure 1:
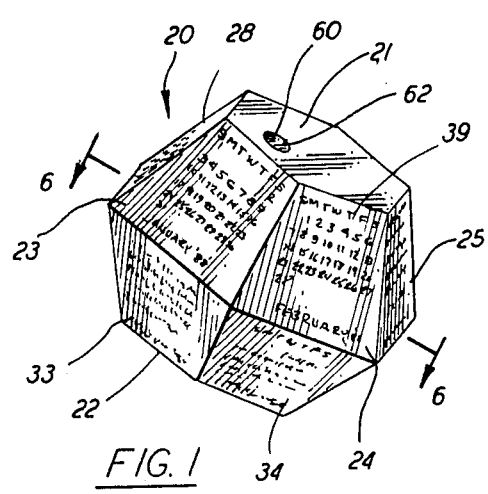
FIG. 1 is a perspective view of a flattenable pop-up structure in its erected display condition incorporating the spectral image viewing device of the present invention.
Figure 2:
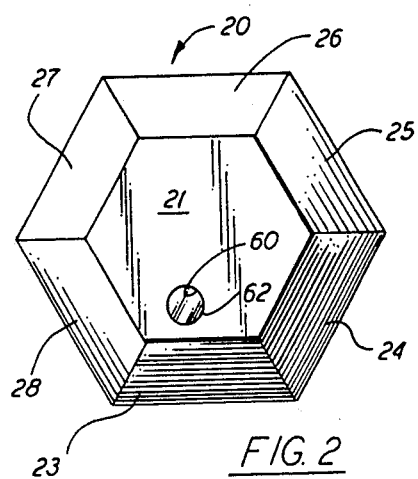
FIG. 2 is a top plan view of the pop-up structure of FIG. 1.
Figure 3:
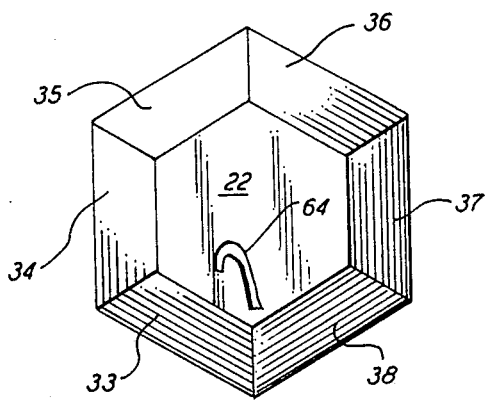
FIG. 3 is a bottom plan view of the same structure.
Figure 7:
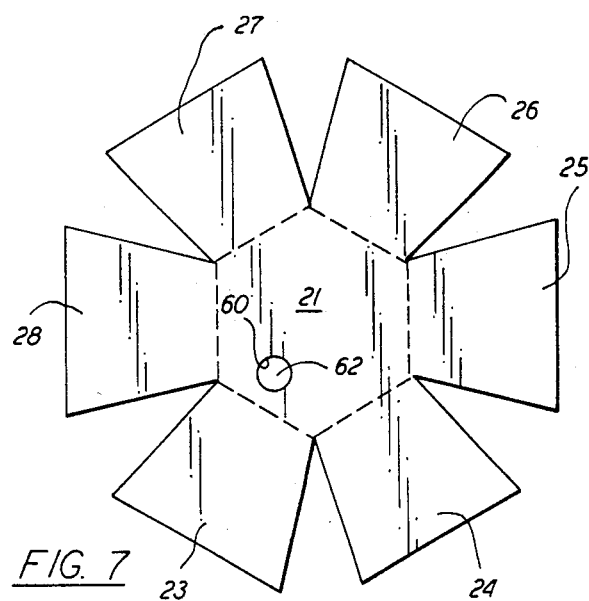
FIG. 7 is a top plan view of the pop-up structure of FIG. 1 in its flattened, collapsed condition.
Figure 8:
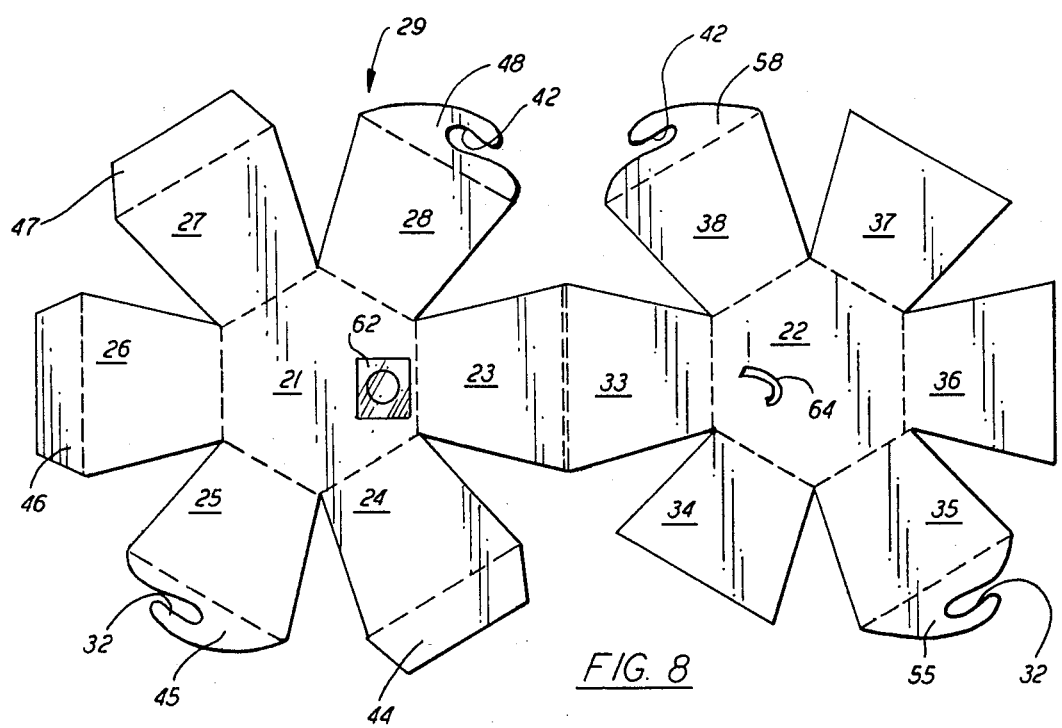
FIG. 8 is a top plan view of a trimmed and scored blank, severed from a foldable sheet of stiff lightweight material, ready to be assembled into a pop-up structure like that of FIG. 1.

Referring first to FIG. 1, therein illustrated is a flattenable self-erecting polygonal structure in the form of a desk top calendar advertising message carrier generally indicated by the numeral 20 and incorporating the spectral image viewing device of the present invention. The structure 20 is a 14-face "tessaradecahedron" and is characterized by a hexagonal top face panel 21 and a corresponding hexagonal bottom face panel 22 on which the structure normally rests, standing on a table top or any similar supporting surface. Six outwardly slanting trapezoidal faces 23-28 extend diagonally outward from the hexagonal top face panel 21, with the short parallel edge of each trapezoidal face foldably joined to one side of the hexagonal top face panel 21. These trapezoidal face panels 23-28 are all virtually identical trapezoids with their diverging sides abutting each other in the erected condition of the structure, as shown in FIGS. 1 and 2. In the flattened condition of the structure 20, illustrated in FIG. 7 for example, the diverging sides of each trapezoid are spread apart in the same manner in which they are formed in the original thin cardboard blank 29 illustrated in FIG. 8. On the lower side of the structure 20 is a second series of corresponding trapezoidal face panels 33-38 with the parallel edges of each trapezoidal foldably joined to an associated one side of the hexagonal bottom face 22 as shown in FIGS. 3 and 8.

In the assembled and self-erected condition of the structure 20, illustrated in FIG. 1, the long parallel edges of the upper trapezoidal faces 23-28 are correspondingly juxtaposed with the respective long parallel edges of the lower series of trapezoidal faces 33-38 forming an attractive, stable and highly useful decoration which may carry calendar month indicia 39, or any desired message such as advertising messages. While the structure can be tilted and rotated to rest on any one of its fourteen (14) faces, it presents a "natural" and stable appearance to the observer when it stands upon one of its hexagonal faces 21 or 22, and this natural stable position may govern the imprinting of any message such as the calendar month indicia 39 shown in FIG. 1. The first six months (January-June) are imprinted on faces 23-28 and are upwardly displayed when the structure 20 rests on face 22. The second six months (July-December) are imprinted on faces 33-38 and may be displayed conveniently when the structure 20 is inverted to rest upon its hexagonal face 21.

The 14-face structure is unusually well adapted to present the 12 months of the calendar, since each of the trapezoidal faces 23-28 and 33-38 can be employed to present a single calendar month, and the structure can be rotated as it rests upon either of its hexagonal faces 21 or 22 to facilitate the display of the current month or any past or future month desired. At the same time, the sponsor's advertising message may appear on each of the hexagonal faces 21 and 22 so that it will be continuously displayed in each of the stable positions of the structure.

Figure 6:
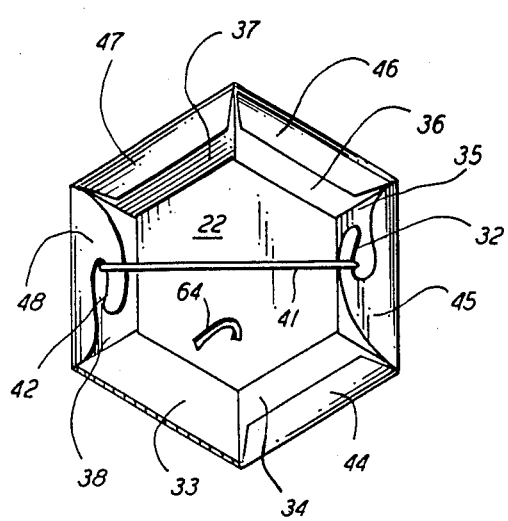
FIG. 6 is a cross-sectional view taken along the 6—6 line as shown in FIG. 1, illustrating the interior of the same pop-up structure in its erected condition.

To assure the proper operation of the flattenable and self-erecting pop-up structure 20 of the invention, a series of glue tabs 44-48 are provided, extending radially outward from the longer parallel edges of trapezoidal face panels 24-28, and the glue tabs are foldably joined to these edges. Blank 20 in FIG. 8 is severed from its surrounding sheet (not shown) along the solid peripheral lines, and scored for folding along the dashed fold lines. As shown in FIG. 8, glue tabs 44-48 are thus foldably joined to the longer parallel edges of respective trapezoidal panels 24-28 by the dashed foldable score lines coinciding with those edges. In a similar manner, glue tabs 55 and 58 (see FIG. 8) are likewise foldably joined along foldable score lines coinciding with longer parallel edges of trapezoidal panels 35 and 38 on the lower half of the overall polygonal structure, illustrated in FIGS. 1 and 6. For convenience, the trapezoidal panels 23 and 33 are preferably foldably joined along their straight outer edges as shown in blank 29 in FIG. 8.

The assembly of the structure can easily be visualized by reference to FIG. 8, where the underside of each glue tab 44-48, 55 and 58 is coated with suitable adhesive either before or after the glue tabs are folded upward out of the plane of the paper and inward toward their respective hexagonal faces 21, 22 to overlay the respective corresponding trapezoidal faces 24-28, 35 and 38 to one of which each of the glue tabs is foldably joined. The entire left half of blank 29 in FIG. 8 is next rotated upward out of the plane of the bank 29, about the long parallel edges of trapezoidal panels 23 and 33. The left portion of the blank 29 of FIG. 8 with its infolded glue coated tabs 44-48 is thus rotated 180 degrees into juxtaposition with the right-hand portion of the blank of FIG. 2 with its infolded glue tabs 55 and 58. As this folding operation continues, the glue coated surface of glue tab 44 and the trapezoidal panel 34 are brought into contact and the glue coated surfaces of infolded glue tabs 48 and 58 are brought into contact followed by the corresponding juxtaposed contact of the infolded glue coated glue tabs 45 and 55, glue coated glue tab 47 and trapezoidal panel 37, and glue coated glue tab 46 and trapezoidal panel 36 (see FIG. 6). The pairs of adhesively joined glue tabs (45, 55 and 48, 58) thus form inwardly protruding flanges extending into the interior of the structure parallel to the faces 21 and 22.

Notches 32 and 42 formed in the free internal edges of flanges or opposed pairs of glue tabs (45, 55) and (48, 58) inside the structure are joined by a stretched elastic band, such as band 41 engaging corresponding notches 32 formed in the mating glue tabs 45 and 55, and similar notches 42 formed in the mating glue tabs 48 and 58. When these notches are connected by the stretched elastic band 41, shown in FIG. 6, spanning the interior of the structure, the elasticity of the band 41 tends to draw flange (45, 55) toward flange (48, 58) with such force that their supporting mating trapezoidal faces (28, 38) and (25, 35) are pivoted apart, separating the upper and lower hexagonal faces 21 and 22 and forcing the flattened structure to pop-up in self-erecting fashion to form the decorative desk top calendar 20 of FIG. 1. By providing a collapsing force on the opposed surfaces 21 and 22, a user can reverse the self-erecting process and easily flatten the device to the position shown in FIG. 7.

The upper trapezoidal faces 23-28 are all preferably substantially identical, as shown in FIG. 8. While the mating long parallel edges of each pair of upper and lower face panels should substantially match, and while lower trapezoidal faces 33-38 are all preferably identical with each other, it is not essential that they be exactly identical to the upper trapezoidal faces 23-28. For example, if the upper trapezoidal faces 23-28 have their parallel edges closer together than those of the lower series of trapezoidal faces 33-38, the central equatorial hexagonal rim of the structure at its central plane formed by the juxtaposed longer parallel edges of the upper series and the lower series of trapezoidal faces will not be equally spaced between top face 21 and lower face 22, but instead will be closer to top face 21, producing an overall polygonal structure with its upper portion appearing flatter than its lower portion, such as that shown in U.S. Pat. No. D 288,410 issued to Christopher S. Crowell on Feb. 24, 1987. Thus, the included angles between the parallel edges of the trapezoidal faces and their diverging sides are not in any way critical and may be chosen to produce the desired decorative appearance of the overall structure.

As previously mentioned, the flattenable self-erecting polygonal structure 20 is provided with the spectral image viewing device of the present invention. The spectral image viewing device includes (1) a circular viewing aperture 60 formed in the hexagonal top face panel 21 adjacent the foldline between top face panel 21 and trapezoidal face panel 23, (2) a square thin semi-transparent sheet 62 of prismatic polytetrafluoroethylene polymer film adhesively bonded to the inner wall of the trapezoidal face panel 21 covering the viewing aperture 60 as best illustrated in FIG. 8 and (3) an image producing aperture 64 formed on the hexagonal bottom face panel 22 adjacent the foldline between bottom face panel 22 and trapezoidal face panel 33. The thin sheet 62 of prismatic polytetrafluoroethylene polymer is prepared from a thin film of polytetrafluoroethylene polymer (sold under the tradename MYLAR) which has been treated or scored by a laser beam to have a pattern or design to thereby produce the desired prismatic effect. The pattern is ideally provided on one face of the film in an optical grating pattern formed as an arrayed plurality of generally v-shaped lands and grooves simulating an arrayed plurality of miniature triangular prisms. The image producing aperture 64 is depicted as having the shape of half an arch but can be made in a number of different forms or designs such as corporate logos, dollar signs, stars, etc. The image producing aperture 64 and the spectral image viewing aperture 60 are formed during the die cutting process used to form the blank 29.

Figure 5:
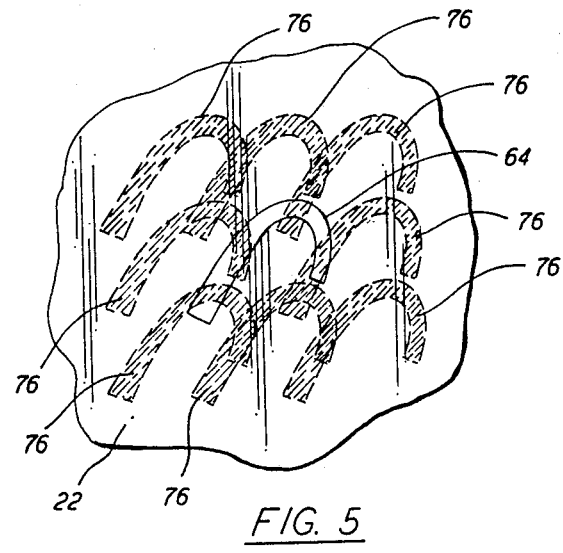
FIG. 5 is an enlarged fragmentary elevational view showing the spectral images seen by the user in FIG. 4.
Figure 4:
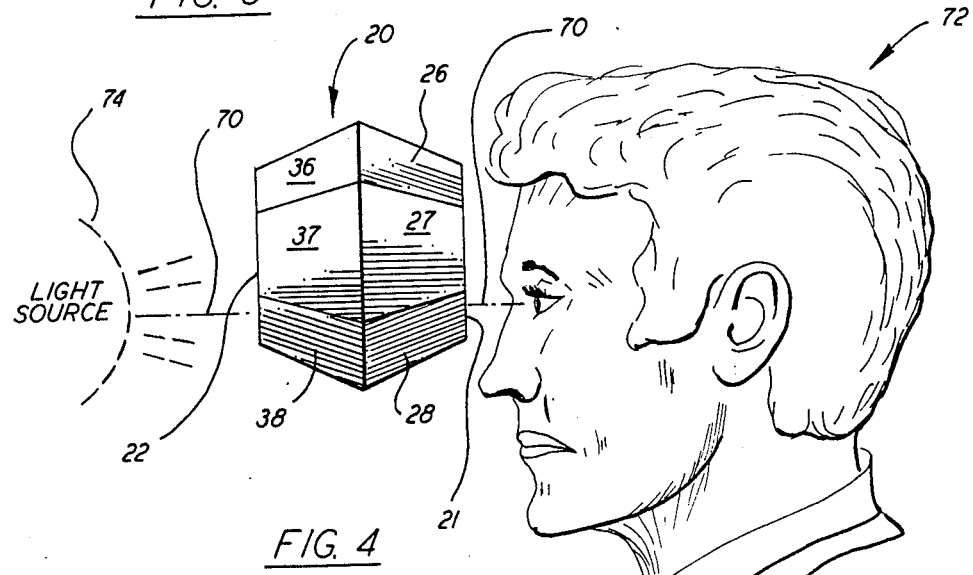
FIG. 4 is a side elevational view illustrating the spectral image viewing device in use.

The normal operation and use of the spectral image viewing device of the present invention can be readily appreciated by referring to FIGS 2,4 and 5. Under the influence of the elastic band 41 (FIG. 6), the flattenable self-erecting pop-up structure 20 automatically achieves its erected position (FIG. 1). The relative positions of the viewing aperture 60 and the image-producing aperture 64 on panels 21 and 22 are such that they are aligned so that the direct line of vision 70 of a user 72, holding the structure 20 and peering into the viewing aperture 60, extends through the thin sheet 62 and the image producing aperture 64 to a light source 74 (i.e. fluorescent, incandescent or natural sunlight) spaced from the structure 20. The light rays coming from the light source 74 and following the direct line of vision 70 enter the darkened enclosure of the pop-up structure 20 through the image producing aperture 64 and pass through the thin sheet 62 and viewing aperture 60 into the eye of the user 72. As they pass through the thin sheet 62, the rays are separated in a prismatic fashion into its spectrum thereby producing a visually perceptible kaleidoscope-type array of spectral images 76 as shown in FIG. 5. The spectral images 76, as the name implies, exhibits a series of colors passing by degrees through red, orange, yellow, green, blue, indigo and violet. The array produced by the half arch shape of the image producing aperture 62 takes the form of a plurality of superimposed rainbow figures in a vivid display of spectral colors.

Figure 9:
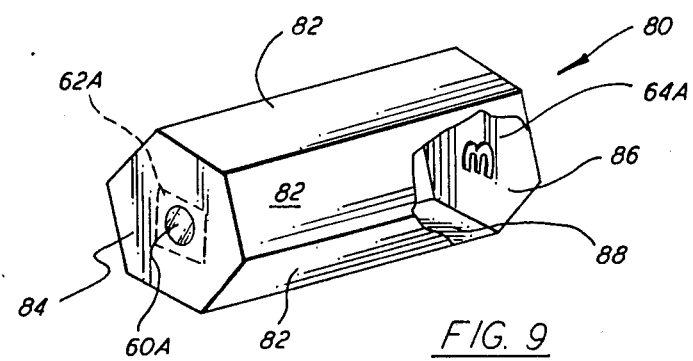
FIG. 9 is a perspective view of a second embodiment of the present invention with a portion broken away to reveal internal structure.

Turning now to FIG. 9, therein illustrated is a second embodiment of the spectral image viewing device generally indicated by the numeral 80. The device is a non-collapsible cardboard structure with six identical rectangular side walls 82 and two spaced apart hexagonal end walls 84 and 86 producing an enclosure 88. The walls 82, 84 and 86 are suitable for printed indicia such as calendars, advertising messages, etc. The first end wall 84 includes a viewing aperture 60A centrally located therein and a thin semitransparent sheet 62A of prismatic polytetrafluoroethylene polymer film adhesively bonded to the inside surface thereof. Centrally located in the second end wall 86 is an image producing aperture 64A in the shape of a dollar sign ($). The second embodiment is used in a fashion similar to the first embodiment, i.e., the user holds the device 80 up to light source and can view an array of spectral dollar sign ($) images through the viewing aperture 60A.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A spectral image viewing device comprising: a structure having first and second spaced apart panels and forming an enclosure, said first panel having a viewing aperture formed therein through which a user can peer, said second panel having an image producing aperture therein in a desired shape, said viewing aperture and said image producing aperture being aligned so that a direct line of vision of a user peering through said viewing aperture extends through said image producing aperture; and a semi-transparent prismatic device mounted within said enclosure between said viewing aperture and said image producing aperture in the direct line of vision of the user, whereby said semi-transparent prismatic device separates white light coming from the exterior of said enclosure and passing through the enclosure between said image producing aperture and said view aperture into an array of visually perceptible spectral images.

2. The spectral image viewing device in accordance with claim 1, wherein said semi-transparent prismatic device is a polytetrafluroethylene polymer film.

3. The spectral image viewing device in accordance with claim 2, wherein said polytetrafluroethylene film has a laser produced pattern thereon.

4. The spectral image viewing device in accordance with claim 3, wherein said polytetrafluoroethylene film has one face grooved in an optical grating pattern formed as an arrayed plurality of generally v-shaped lands and grooves simulating an arrayed plurality of miniature triangular prisms.

5. The spectral image viewing device in accordance with claim 1, wherein said semi-transparent prismatic device covers said viewing aperture.

6. The spectral image viewing device in accordance with claim 5, wherein said semi-transparent prismatic device is mounted on said first panel adjacent and covering said viewing aperture.

7. The spectral image viewing device in accordance with claim 1 wherein said structure is a flattenable pop-up structure formed of stiff foldable sheet material, self-erectable into an erect configuration resembling a polygonal solid.

8. The spectral image viewing device in accordance with claim 7, wherein said first and second panels are similar polygonal top and bottom face panels with pairs of upper and lower trapezoidal face panels, having short parallel edges foldably joined to said polygonal top and bottom face panels.

9. The spectral image viewing device in accordance with claim 8, wherein said pairs of upper and lower trapezoidal face panels extend diagonally outwardly from said top and bottom face panels to meet in an equatorial plane with longer parallel edges foldably joined together to define an equatorial plane polygon similar to but larger than said top and bottom polygonal face panels.

10. The spectral image viewing device in accordance with claim 1, wherein said semi-transparent prismatic device has one face grooved in an optical grating pattern formed as an arrayed plurality of generally v-shaped lands and grooves simulating an arrayed plurality of miniature triangular prisms.

* * * * *